Figure 5:
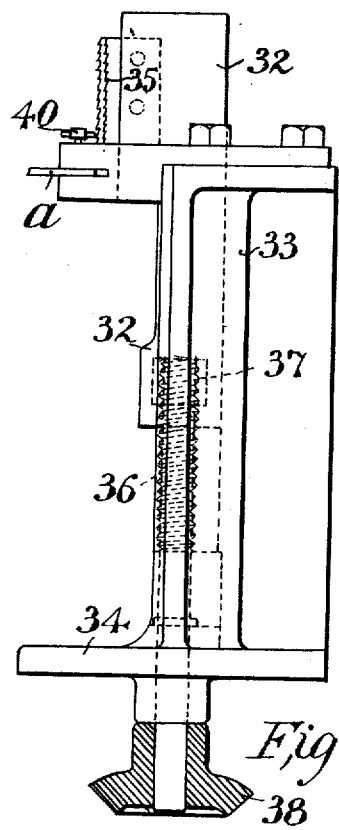

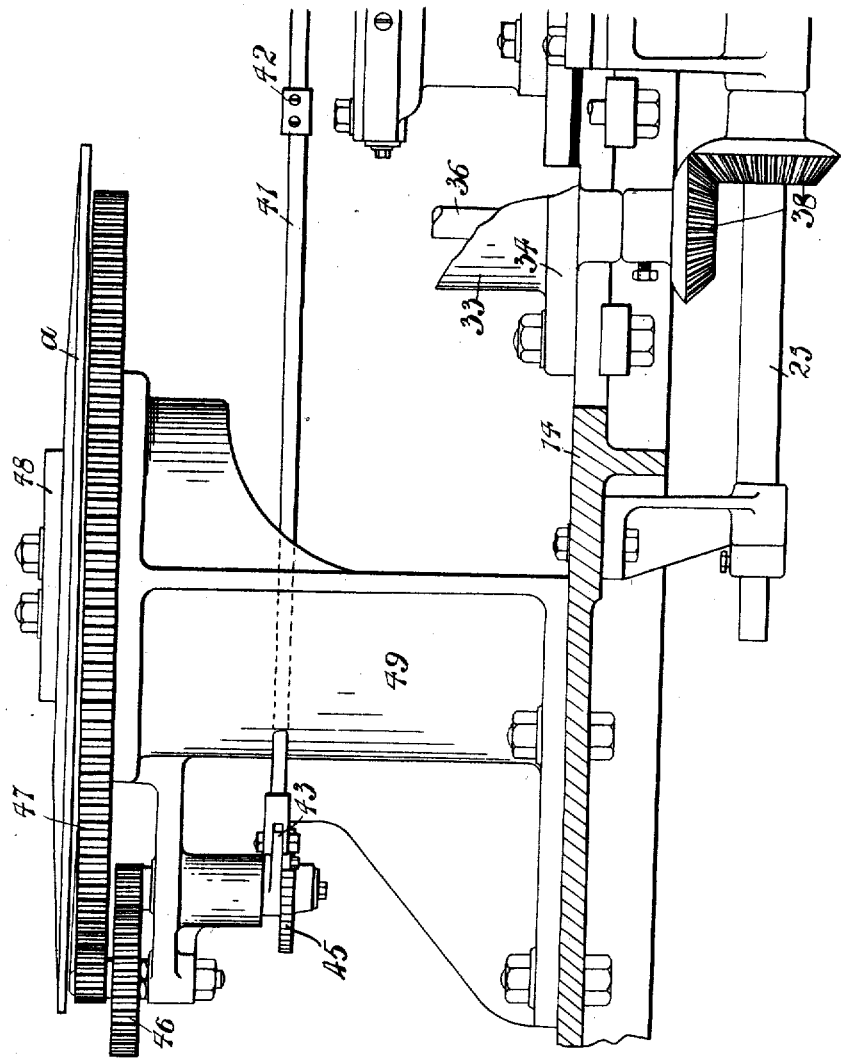

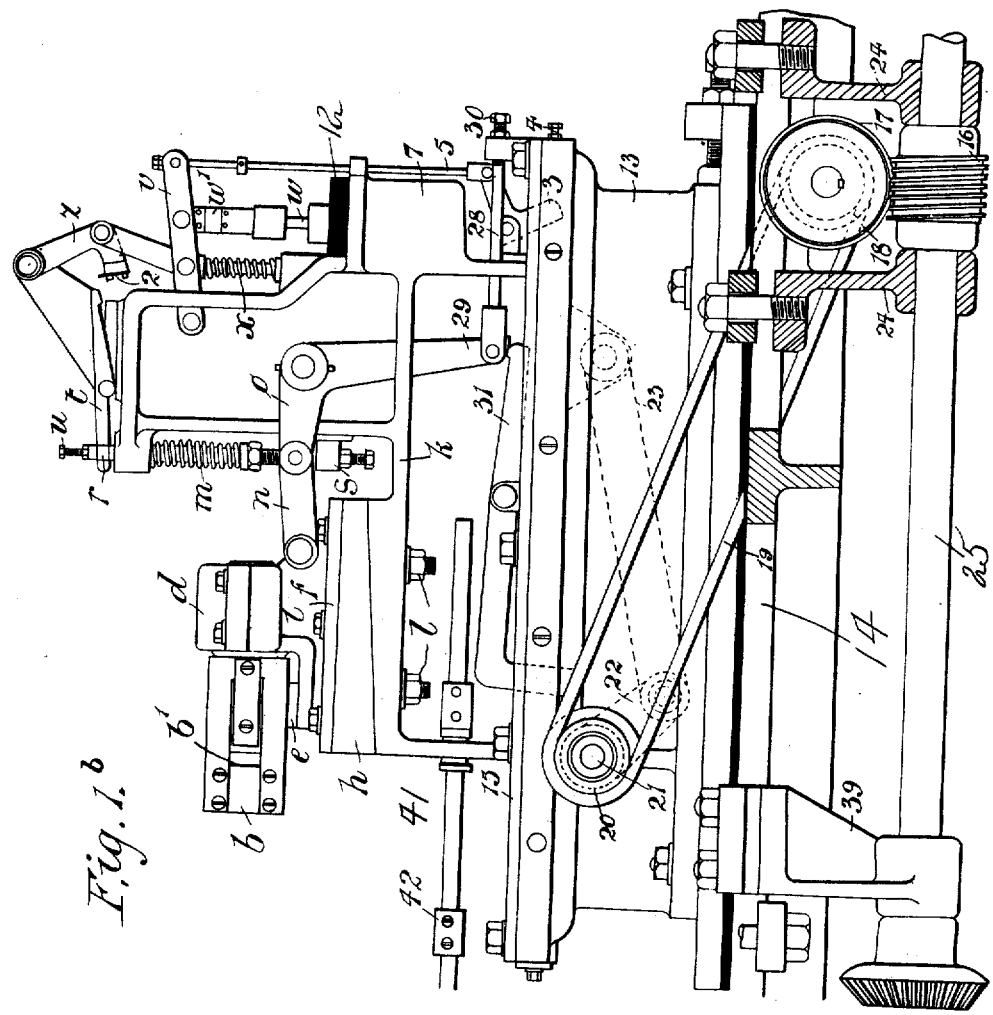

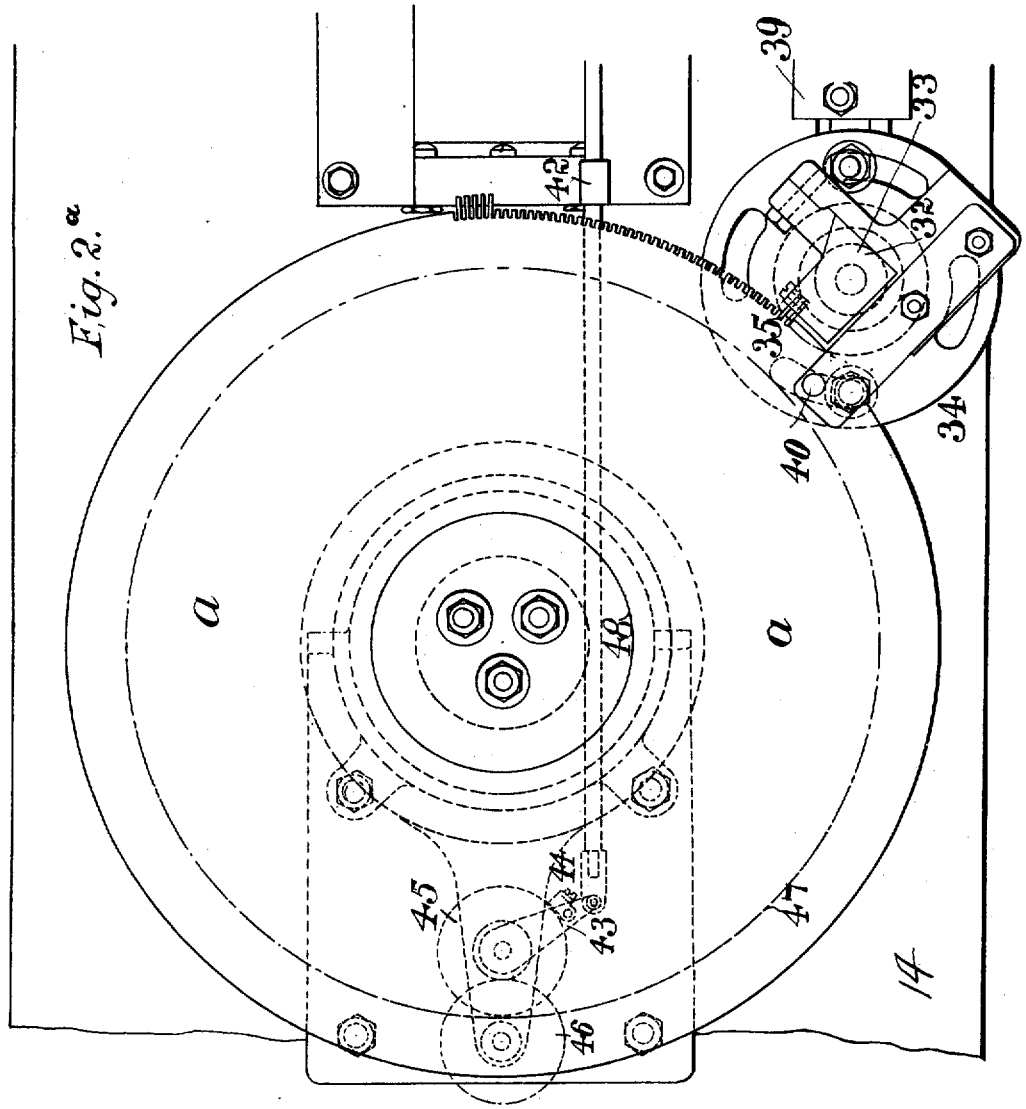

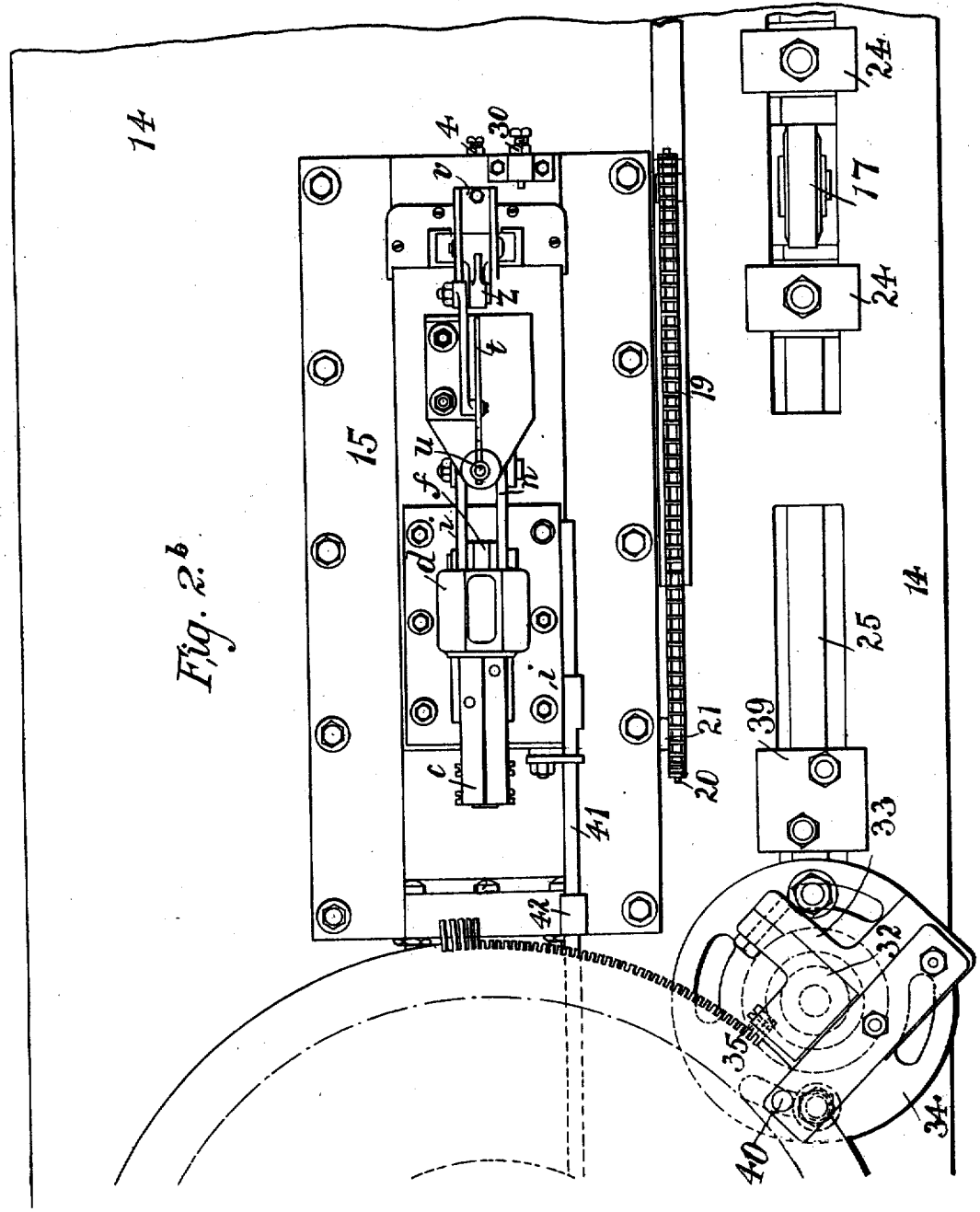

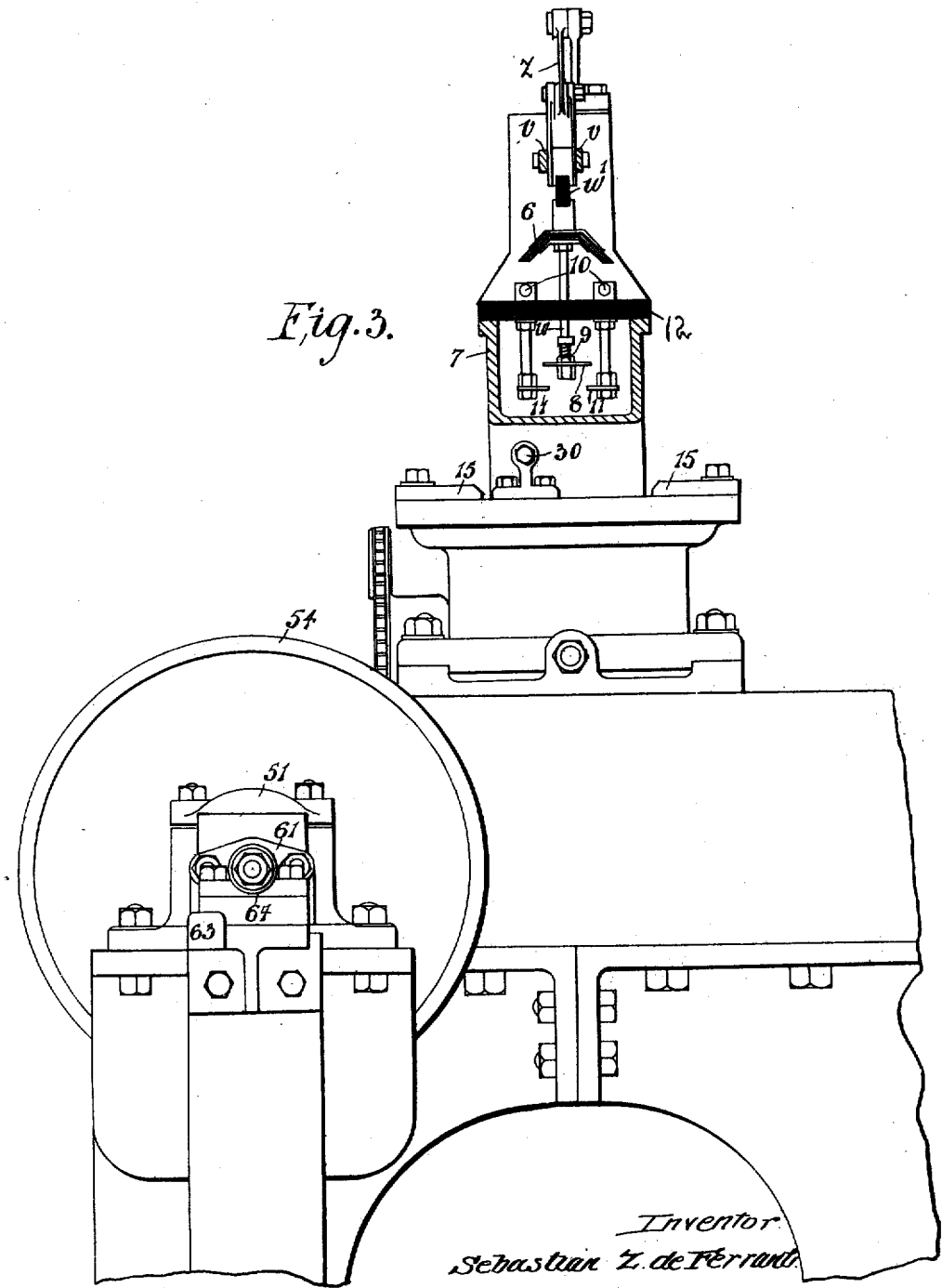

S. Z. DE FERRANTI.
TURBINE BLADE FIXING MACHINE.
APPLICATION FILED SEPT. 26, 1904.

911,222.

Patented Feb. 2, 1909.
9 SHEETS—SHEET 6.

Attest:
C. J. Middleton
Edward Sarton

Inventor
Sebastian Z. de Ferranti
By Spear, Middleton, Donaldson & Spear
Attys.

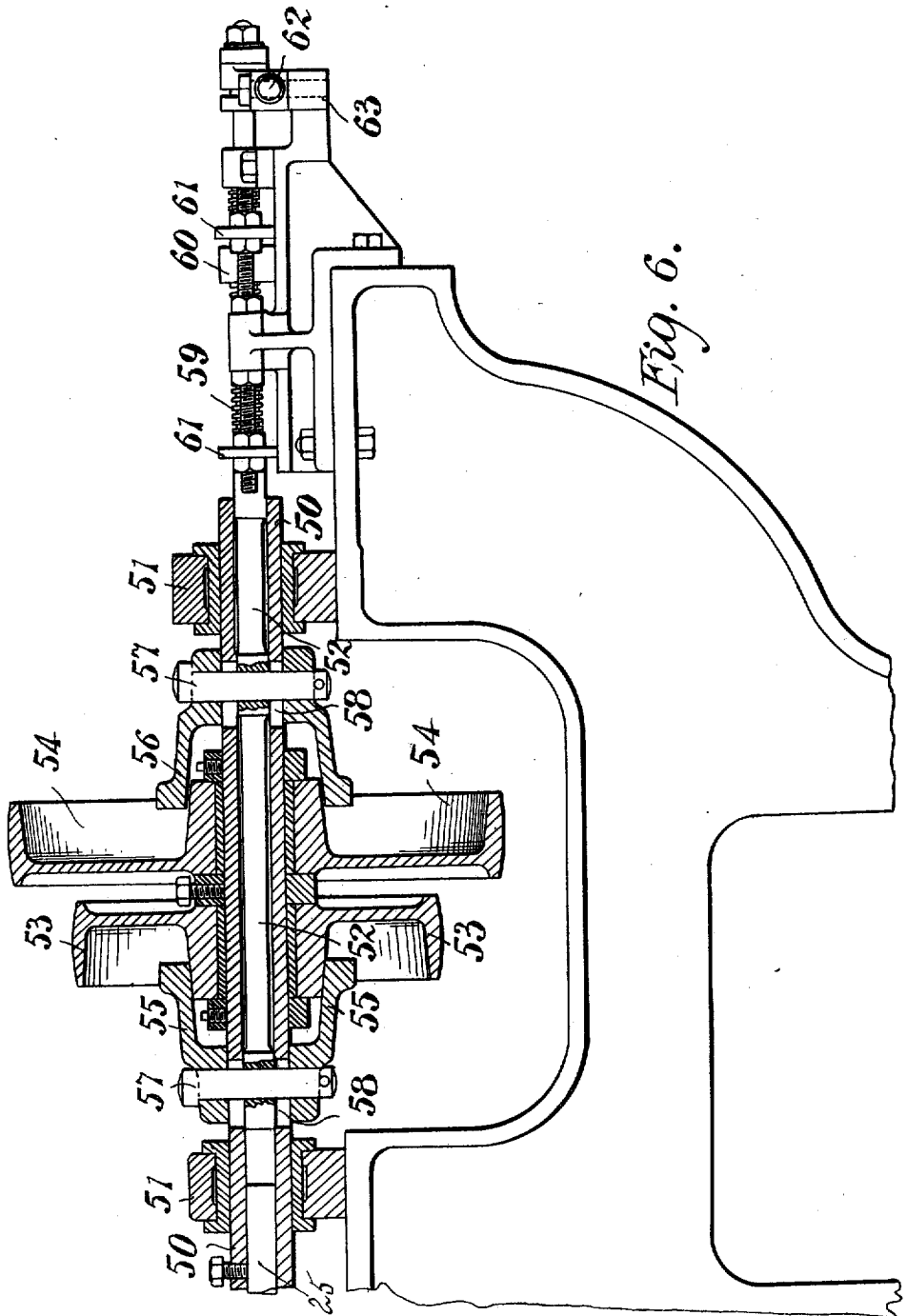

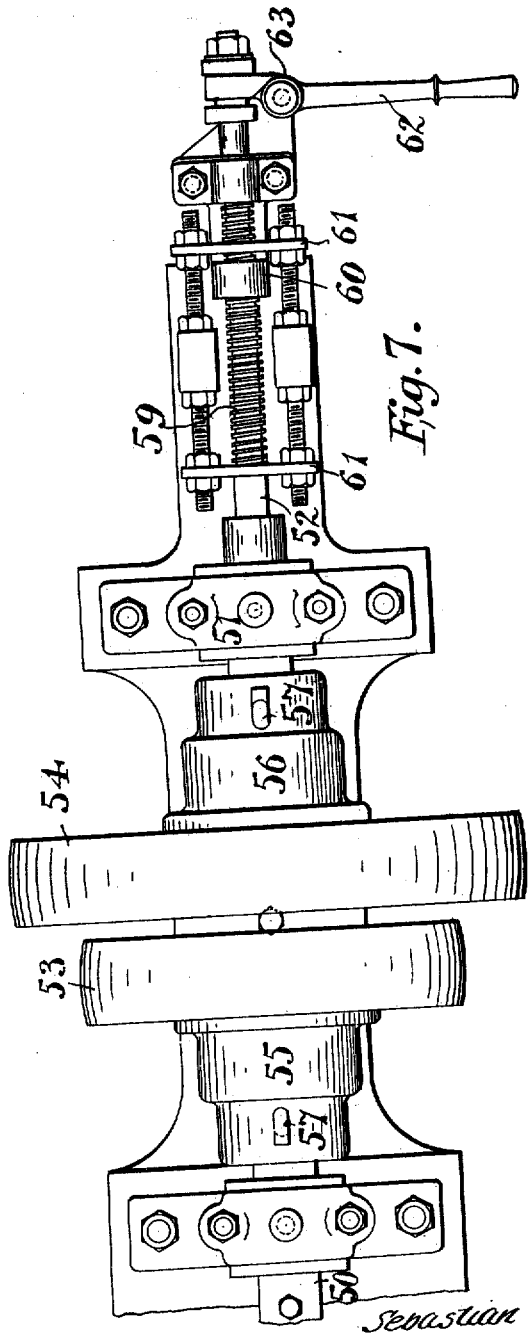

S. Z. DE FERRANTI.
TURBINE BLADE FIXING MACHINE.
APPLICATION FILED SEPT. 26, 1904.

911,222.

Patented Feb. 2, 1909.
9 SHEETS—SHEET 9.

Attest:
C. S. Middleton
Edward Sarton

Inventor
Sebastian Z. de Ferranti
by Spear, Middleton, Donaldson & Spear
Attys.

UNITED STATES PATENT OFFICE.

SEBASTIAN ZIANI DE FERRANTI, OF HAMPSTEAD, LONDON, ENGLAND.

TURBINE-BLADE-FIXING MACHINE.

No. 911,222.

Specification of Letters Patent.

Patented Feb. 2, 1909.

Application filed September 26, 1904. Serial No. 226,048.

*To all whom it may concern:*

Be it known that I, SEBASTIAN ZIANI DE FERRANTI, a subject of the King of Great Britain and Ireland, and residing at 31 Lyndhurst road, Hampstead, London, N. W., England, have invented certain new and useful Improvements in Turbine-Blade-Fixing Machines, of which the following is a specification.

This invention relates to the electric welding of turbine blades on to the wheels, rings, drums or the like carrying them, the object of the invention being the provision of a machine whereby the blades used in turbines can be welded to the parts carrying them with great rapidity and accuracy.

The invention consists of a turbine blade welding machine comprising the novel devices and combinations of devices which will be hereinafter described and particularly defined in the claims.

The operations to be carried out by the machine are broadly as follows:—The wheel (for example) to which the turbine blades are to be welded, having been placed in the machine, is automatically rotated step by step through the required distance. Each turbine blade, clamped between jaws adapted to carry the electric current is forced by suitable means into contact with the part of the wheel to which it is to be welded. The current is then applied softening the parts to be welded one of which then approaches the other, this comparatively small motion being magnified by suitable mechanism which cuts off the current after the desired heating and softening has been effected. The welded blade is then released preferably automatically and the machine resets itself to receive another blade, the cycle of operations being then repeated. The machine in addition to carrying out the operations described above may also prepare the wheel or disk by slotting drilling and the like in advance of the weld as regards position on the wheel and without slackening the progress of the welding operation, the machine thus taking a plain wheel or disk and doing all that is necessary to it until it appears as a finished article with all the blades welded on. The object of this preliminary treatment of the wheel by slotting, drilling and the like is to limit the cross-sectional area in the neighborhood of the welding point available for the flow of heat therefrom, so as to localize the heat of the weld and cause wheel and blade to rise to the required welding temperature in about the same time.

Figure 4:
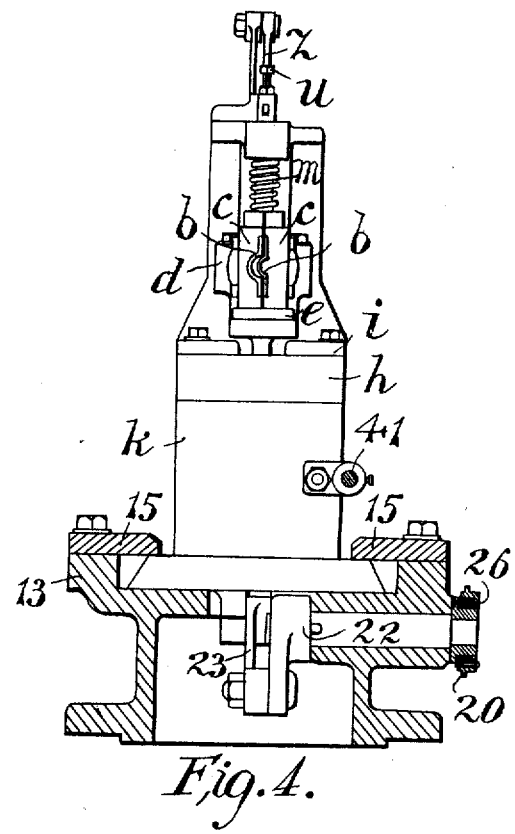
Figure 8:
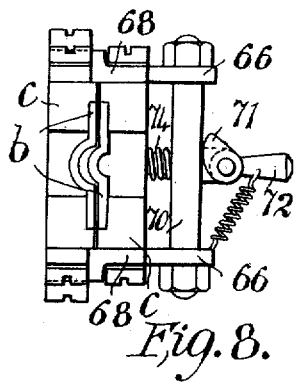
Figure 9:
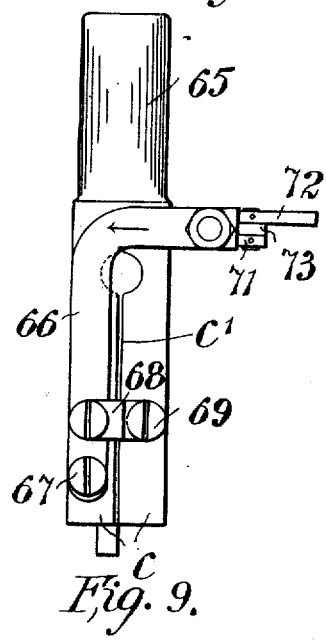

Referring to the accompanying drawings:— Figures 1ª and 1ᵇ show a side elevation of the greater portion of the machine. Figs. 2ª and 2ᵇ show a plan thereof. Fig. 3 is an end view partly in section, as seen from the right in Fig. 1, Fig. 4 showing an end view of the welding head but as seen from the left in Fig. 1ᵇ; Fig. 5 shows an elevation of the slotting attachment supposed removed from Fig. 1ª; Figs. 6 and 7 show sectional elevation and plan respectively of the automatic stopping gear, while Figs. 8 and 9 show side and end views respectively of a form of blade holder having a mechanical clamping device, Figs. 10 and 11 being similar but with the clamping device operated electromagnetically.

In carrying the invention into effect according to one form as shown in the drawings applied to the welding of blades upon a turbine wheel, $a$, the blade to be welded is held between renewable copper jaws, $b$, between which it is inserted so as to abut against a suitable stop, $b'$, these jaws being of suitable shape and fixed by screws to the copper jaw holder, $c$. Details of the jaw holder together with methods of clamping the blade are hereinafter described with reference to Figs. 8 to 11. The shank or end of the jaw holder remote from the blade is made cylindrical and clamped in a cylindrical bearing having a copper cap, $d$, suitably connected to one pole of a transformer, battery or the like. The jaw holder may be clamped in its cylindrical bearing in any position to suit the setting angle of the blades, a wedge such as $e$, of the necessary taper, being preferably inserted between the jaw holder, $c$, and a planed surface on the cross head, $f$, carrying the cylindrical bearing, thus insuring the correct angle and safeguarding against its alteration. The crosshead, $f$, works in a slide, $h$, and is held in position by slide bars, $i$; the lower face of the slide is inclined and coöperates with a corresponding inclined face formed on the welding head casting, $k$, thus providing means for giving a delicate vertical adjustment to the crosshead. Studs or the like passing through slots in the welding head and nuts, $l$, are provided for clamping the slide in place.

The pressure at the weld is obtained by means of an adjustable spring, $m$, acting through a toggle, formed by the double link, $n$, pivoted on the crosshead, $f$, and one leg, $o$, of a bell crank pivoted on the welding head, k. A rod, r, connected to the toggle center serves to transmit the pressure of the spring, m, an adjustable stop, s, being provided to limit the downward movement of the toggle center. The rod, r, passes through the spring, m, and is provided at its upper end with a slot through which passes the tail end of a catch lever, t, pivoted on the welding head; the pressure of the spring is transmitted to the catch lever through an adjustable set-screw, u, projecting into the slot. This method obviates any side pressure and consequently friction on the toggle rod.

The automatic switch, which is of the oil-break pattern, is operated from a pair of levers, v, pivoted on the welding head, by means of the spindle, w. A downward pull on the outer end of this double lever, v, forces the switch on to its contacts against the pressure of a strong spring, x, and also straightens out the links, z, above, so that a catch piece, 2, fastened to one of these links, moves under and is caught by the end of the catch lever, t, thus retaining the switch in the "On" position. The switch is pulled on automatically as the welding head (operated in a manner to be described) reaches the back end of its stroke, by a bell crank lever, 3, one leg of which comes in contact with a fixed adjustable stop, 4, while the other is linked to the outer end of the double lever, v, by means of the rod, 5. The switch (see also Fig. 3, in which the rod, 5, is removed and the oil well wall partly broken away) is insulated from the levers, v, by means of the fiber block, w', forming part of the switch spindle, w, which is carried down into the oil well, 7, conveniently cast in one with the welding head. Two sets of contacts are provided, the upper or primary, 6, being preferably formed of laminated strips of copper; the lower or secondary contacts, 8, are arranged to make contact first and break last, this action being insured by means of the light spring, 9. The break of the secondary contacts takes place in oil, thus preventing any arcing at the primary contacts. The main contatct blocks, 10, to which the leads are connected, and the secondary contacts, 11, are mounted on an insulating ebonite base, 12.

To free itself from a blade that has just been welded, so that the turbine wheel or ring may rotate into position for the next weld, the welding head, k, travels back in a slide formed in the box casting, 13, which is insulated from the main frame, 14, of the machine, in relation to which it is adjustable by means of studs and slots, adjusting screws or the like means, so that it can be secured in any position to suit different sizes of turbine wheels and length of blades. Slide bars, 15, (see Fig. 4) constrain the motion of the welding head. This motion of the welding head is taken from a worm, 16, and worm wheel, 17, a sprocket wheel, 18, mounted on the worm wheel shaft, and chain, 19, serving to transmit the motion to a second sprocket wheel, 20, which together with a crank, 22, is mounted on the spindle, 21, this crank being linked to the welding head by means of the connecting rod or pitman, 23. The position of the bracket, 24, carrying the worm wheel, 17, and sprocket wheel, 18, can be adjusted to correspond with that of the box casting, 13. The worm, 16, is driven through a feather by the shaft, 25, the motion of which is so controlled (in a manner to be hereinafter described) as to cause the crank, 22, to make half revolutions alternately backwards and forwards, at the end of each of which the shaft, 25, stops automatically. The sprocket wheel, 20, is insulated from the welding head by means of the fiber ring, 26, seen in Fig. 4.

As the welding head approaches the back of its stroke, the switch is closed automatically as mentioned above and the rod, 28, pivoted to the end of the leg, 29, of the toggle bell crank, strikes against the fixed adjustable stop, 30, and causes the toggle center to rise, thus drawing the blade holder backwards. The leg, 29, of the toggle bell crank is then caught and held by the trip lever, 31, pivoted on the welding head. This lever, 31, is tripped by the crank at both ends of the stroke but at the back end it is arranged that the toggle bell crank shall be held by the rod, 28, and stop, 30, till after the crank is clear, so that the welding head moves forward with the trip lever, 31, in gear.

The full cycle of operations is thus as follows:—The blade to be welded, having been placed in the jaws, b, with the welding head in its backward position, the shaft, 25, is started with the switch in the "on" position and both the trip or catch levers, 31 and t, in gear. The shaft, 25, is stopped automatically (in a manner to be explained) as the blade reaches the turbine wheel and at the same time, the crank, 22, trips the lever, 31, thus freeing the toggle bell crank and allowing the spring, m, to produce pressure on the weld. The electric current may be controlled by an independent switch under the control of the attendant or this switch may be kept closed during the whole operation, in which latter case the welding starts simultaneously with the tripping of the trip lever, 31. As the blade softens under the heat, the pressure of the spring, m, causes a slight shortening of the blade, this shortening being greatly magnified by the toggle and causing a comparatively large movement of the rod, r, which descends and trips the catch lever, t, thereby leaving the spring, x, free to act to open the switch. The shaft, 25, is then reversed and the welding head returned to the back end of its stroke, where it is again stopped automatically after switching on the current and setting the trip lever, 31. The adjustable stops, s and u, enable the machine to be set to break contact at the exact time when the shortening of the blade corresponds to a satisfactory weld.

If the turbine wheel, a, is to be prepared by slotting in order to localize the heat of the weld as explained above, the slotting head, 32, (see Fig. 5 where the slotting attachment is shown removed from the machine) is constrained to move in a casing or frame, 33, forming a vertical slide and having a slotted flange, 34, at the base, by means of which it can be adjusted tangentially and bolted to the bed or frame, 14, of the machine; a slot in this frame also enables it to be adjusted longitudinally within the limits of the machine, so as to suit different sizes of turbine wheels. The cutting is done by one or more serrated cutters, 35, carried by the slotting head, the serrations being arranged in steps so that each tooth cuts deeper than the preceding one. In Fig. 2ª, two such cutters are indicated, the one being arranged in advance of the other as regards depth of cut. The slotting head is reciprocated by means of an internal screw, 36, engaging with a square nut, 37, fitting in a corresponding recess in the slotting head, 32, the screw, 36, being driven off the main motion shaft, 25, through bevel wheels, 38, one of which is slidably mounted on the shaft, 25, and is driven by a feather, the bracket 39, which holds this wheel in position being adjustable longitudinally to correspond with different positions of the gearing. A clamp, 40, is provided to prevent the wheel vibrating as the cut is taken, this latter operation taking place as the welding head moves forward. After a new blade is welded in place, the motion of the shaft, 25, is reversed, thus causing the welding head to return and withdrawing the serrated cutters through the slots they have just formed. It is not until the cutters are well clear of the turbine wheel, that is to say, not until the welding head is towards the back end of its stroke, that the automatic gear is operated to turn the wheel into position for the next weld. This operation is effected by a rod, 41, passing through a hole in the welding head casting and having adjustable stops, 42, fixed to it. The rod actuates a crank, 43, carrying a spring pressed pawl, 44, which coöperates in the usual manner with a ratchet wheel, 45, the motion of this wheel being transmitted by suitably proportioned gear wheels, 46, to the last wheel, 47, of the train, to which the turbine wheel is secured by means of the clamping plate, 48.

The dividing motion mechanism just described is supported on a suitable stool, 49, which may itself be adjustable with regard to the bed plate, if desired. The necessary adjustments to allow for different blade spacings are preferably made by altering the ratchet wheel, 45, or by setting the movable stops, 42, so as to cause the pawl, 44, to take the required number of teeth, and leaving the gear wheels, 46, 47, unchanged.

Referring to Figs. 6 and 7, the method of controlling the motion of the shaft, 25, will now be described. To the end of the main shaft, 25, a hollow prolongation or sleeve, 50, is rigidly secured, this sleeve being supported in suitable bearings, 51, and containing in its center an easily fitting steel rod, 52. On the sleeve, 50, two loose pulleys, 53, 54, are mounted, adapted to run in opposite directions, the bosses of these pulleys being coned to form the male elements of friction clutches. The corresponding female clutches, 55, 56, slidably mounted on the sleeve, 50, are secured to the central rod by cotters, 57, which pass loosely through slots, 58, in the sleeve, 50. Thus a pull on the central rod in either direction will engage one or other of the clutches and the corresponding pulley will then drive the shaft.

As the gear is arranged in the machine described above, it is necessary for the shaft to make twenty revolutions only in the one direction, then to stop automatically and when started again by the attendant, to make exactly twenty more revolutions in the other direction and so on. This is provided for as follows: An extension, 59, of the central rod, 52, outside the sleeve, 50, is screwed and engages with a nut, 60, which is prevented from rotating by means of a suitable flat surface formed upon it. As the rod, 52, rotates, the nut, 60, travels along the rod until it comes in contact with one or other of the fixed adjustable stops, 61, through the center of each of which the rod loosely passes. The nut, 60, being prevented from traveling further, any continuance of the sleeve's rotation, causes the central rod, 52, to be drawn through the nut, thus releasing the particular driving clutch engaged and stopping the shaft, 25. It is impossible for the attendant to start the shaft again in the same direction, but by pulling the central rod a little further in the same direction as it was drawn by the nut, the other clutch will engage and the shaft run backwards until automatically stopped as before. For the purpose just mentioned, a forked starting handle, 62, pivoted on the bracket, 63, and engaging with collars, 64, in the central rod, is provided. The two loose pulleys are preferably of different sizes, so that a slower speed is given to the main shaft when the slotting head is cutting than when it is returning.

It will be understood that the automatic stopping mechanism just described is shown detached from the rest of the machine in plan and elevation merely for convenience in drawing but it is preferably mounted on the same rigid framework as the welding head and other parts above described as indicated in end view in Fig. 3.

Referring now to Figs. 8 and 9, details are given of the jaw holder already referred to in the general description of the machine, the stop, $b'$, alone being omitted.

According to the form illustrated, the jaw holder, $c$, is provided at the end remote from the blade with a circular shank, 65, which is clamped in its bearing at any suitable angle as already described. The blade end of the jaw holder is separated into two branches by means of the slot, $c'$, each part carrying a copper jaw, $b$, shaped so as to clear adjacent blades; between the jaws, $b$, the blade to be welded is clamped and in order to insure a good contact and rigid holding of the blade in the jaws, a clamping device is preferably arranged in addition to that provided by the spring of the two branches of the jaw holder.

According to one form, links, 66, are pivoted at 67 to one branch of the jaw holder, while short cross links, 68, connect the links, 66, to the other branch, to which they are pivoted at 69. The long links, 66, are curved as shown and are connected at their non-pivoted ends by the cross piece, 70, to which pressure to clamp the blade is applied in the direction of the arrow (see Fig. 9) by means of the cam, 71, and hand lever, 72, both of which are secured to a common axle rotatably mounted on any convenient pillar, 73, or the like. A spring, such as 74, serves to return the links when the blade is released.

Figure 10:
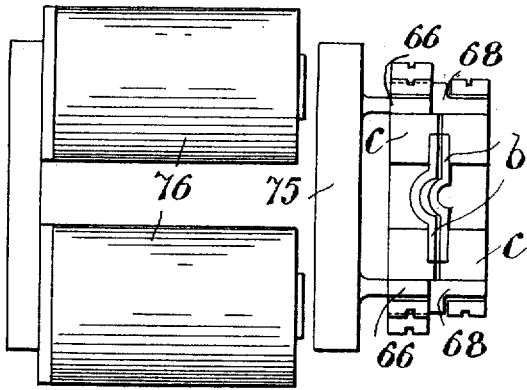
Figure 11:
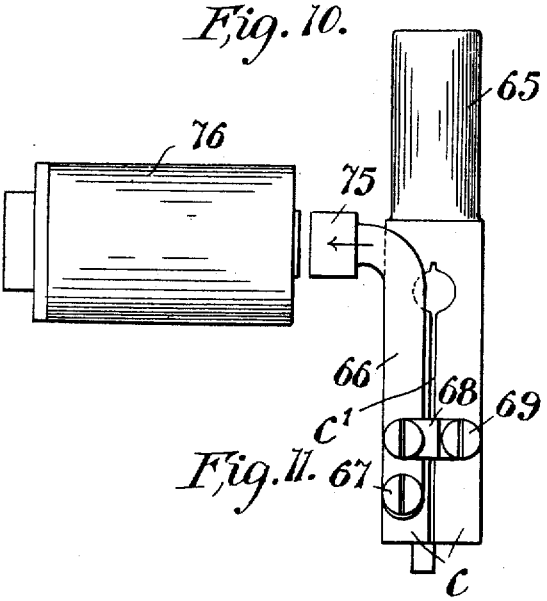

A modification of the clamping device just described is shown in Figs. 10 and 11, corresponding parts being denoted by the same reference symbols. The links, 66, in this modified form are curved in a contrary direction to those of Figs. 8 and 9 and their ends are united by an armature, 75, adapted to be attracted by one or more electromagnets, 76, supported in any convenient manner on a bracket or the like secured to the crosshead, $f$.

In the case where blades are to be welded to a turbine ring, the arrangement of parts is essentially the same as that already described with the exception that the ring encircles the welding head.

I wish it to be understood that although for convenience of language I have used the word "blade" in the claims appendent hereto, nevertheless I intend to include under this term the case in which a strip of metal formed to the cross section of the blade and of any desired length is welded in place and subsequently finished to the precise length required, both cases being obviously within the scope and spirit of my invention.

Having thus described my invention, what I claim as new and desire to secure by Letters Patent is:

1. In combination in apparatus for welding turbine blades to their carrying elements, means for pressing the turbine blade and carrying element together, including a movably mounted blade clamp adapted to carry electric current and means for automatically effecting a relative displacement of the carrying element and blade clamp, substantially as described.

2. A machine adapted to electrically weld turbine blades to their carrying elements comprising in combination means for causing a blade and its carrying element to contact and be pressed together, means for leading current to and from the welding point together with means for effecting a relative displacement of the blade and carrying element for the next weld, substantially as described.

3. A machine adapted to electrically weld turbine blades to their carrying elements comprising in combination means for causing a blade and its carrying element to contact and be pressed together; means for leading current to and from the welding point; means for removing metal from said carrying element in advance of the welding point together with means for effecting a relative displacement of the blade and carrying element for the next weld, substantially as described.

4. A machine adapted to electrically weld turbine blades to their carrying elements comprising in combination rotatably mounted blade carrying element carrying means; a blade clamp; a slidably mounted welding head carrying said blade clamp; together with means for causing said blade clamp and said rotatable means to approach, substantially as described.

5. A machine adapted to electrically weld turbine blades to their carrying elements comprising in combination, means for causing a blade and its carrying element to approach; a toggle device for producing pressure at the welding point; means for leading current to and from said welding point together with means for effecting a relative displacement of the blade and carrying element for the next weld, substantially as described.

6. A machine adapted to electrically weld turbine blades to their carrying elements comprising in combination, a slidably mounted welding head; means for holding a blade therein; means for leading current to the welding point; means including a crank and a pitman for reciprocating said welding head together with means for causing said crank to stop automatically at the end of each half revolution, substantially as described.

7. A machine adapted to electrically weld turbine blades to their carrying elements comprising in combination rotatably mounted blade carrying element carrying means; a slidably mounted welding head, means for causing said welding head to reciprocate together with means operated from said welding head for turning said rotatable means into a position for the next weld, substantially as described.

8. A machine adapted to electrically weld turbine blades to their carrying elements comprising in combination means for causing a blade and its carrying element to approach; a toggle device for producing pressure at the welding point; a switch together with means operated from said toggle for opening said switch when the weld is completed, substantially as described.

9. A machine adapted to electrically weld turbine blades to their carrying elements comprising in combination a slidably mounted welding head carrying a blade holder slidable relative thereto; automatic means for reciprocating said welding head, together with automatic means for reciprocating said blade holder relatively to said welding head.

10. A machine adapted to electrically weld turbine blades to their carrying elements comprising in combination a slidably mounted welding head; means for reciprocating said welding head including a main motion shaft; clutches adapted to drive said shaft in either direction together with means including a traveling nut and a screwed slidable extension of said shaft for stopping said shaft at each end of the travel of said welding head, substantially as described.

11. In combination in apparatus for welding turbine blades to their carrying elements, means for pressing a turbine blade and carrying element together, including a slidable blade clamp adapted to carry electrical current; means for automatically setting the blade carrying element in position for the next weld, substantially as described.

12. In combination in apparatus for welding turbine blades to their elements, means for holding a blade including electromagnetically operated clamping jaws, means for causing a blade and its carrying element to contact and be pressed together and means for leading current to and from the welding point, substantially as described.

13. In combination in apparatus for electrically welding blades to their carrying elements, means for causing a turbine blade to approach its carrying element, means caused to operate by said approaching means for pressing said blade and carrying element together and means for automatically switching off the welding current when the weld is complete, substantially as described.

14. In combination in apparatus for electrically welding blades to their carrying elements, means for causing a turbine blade to approach its carrying element, means caused to operate by said approaching means for pressing said blade and carrying element together, a blade holder through which current is led to the welding point and means for automatically effecting a relative displacement of said carrying element and holder, substantially as described.

15. In combination in apparatus for fixing blades to their carrying elements, means for pressing a turbine blade and carrying element together including a blade holder and means for setting the angle thereof, substantially as described.

16. In apparatus for fixing turbine blades to their carrying elements, means for holding and clamping a blade, comprising a jaw holder having members movable for clamping purposes relatively to one another and having also an aperture passing through from side to side thereof in the direction of said clamping movement together with jaws supported by said jaw holder, said jaws having an operative clamping portion within said aperture.

17. In apparatus for fixing blades to their carrying elements, a blade holder having clamping elements said holder being rotatably mounted for setting the angle of the blades in relation to their carrying elements, substantially as described.

18. In apparatus for fixing turbine blades to their carrying elements, means for holding and clamping a blade, said means comprising duplicate co-acting sets of elements, each set including a clamping jaw having an operative clamping portion together with a lateral portion disposed on each side thereof and including also a jaw-holder having force-applying members co-acting respectively with said lateral portions.

19. In apparatus for fixing turbine blades to their carrying elements, means for holding and clamping a blade, said means comprising duplicate co-acting sets of elements, each set including a substantially U-shaped jaw-holder and including also a clamping jaw disposed intermediate of and in pressure-transmitting contact with the legs of said U-shaped jaw-holder.

20. In apparatus for fixing turbine blades to their carrying elements, means for holding and clamping a blade, said means comprising duplicate co-acting sets of elements, each set including co-planar jaw-holder members, the plane of the members of one of said sets being substantially parallel to the plane of the members of the other of said sets, and each set including also a clamping jaw disposed intermediate of and in pressure-transmitting contact with said members; together with means for actuating said co-acting sets in a direction transverse to the plane in which are disposed the jaw-holder members of either of them.

21. In apparatus for fixing turbine blades to their carrying elements, means for holding and clamping a blade comprising a jaw holder together with clamping jaws supported by said holder, one of said clamping jaws having an operative clamping convex area on the side thereof adjacent to said other jaw and a concave area on the side remote and the other of said clamping jaws having an operative concave area on the side thereof adjacent to said first mentioned jaw and a convex area on the side remote, substantially as described.

22. In apparatus for fixing turbine blades to their carrying elements, means for holding and clamping a blade, comprising a jaw-holder together with clamping jaws supported by said holder, one of said clamping jaws having an operative clamping protuberant area on the side thereof adjacent to said other jaw and a hollow area on the side remote and the other of said clamping jaws having an operative hollow area on the side thereof adjacent to said first mentioned jaw and a protuberant area on the side remote, substantially as described.

23. A machine adapted to fix turbine blades to their carrying elements comprising in combination means for holding a blade; means for holding a carrying element; means for setting the relative angle between said blade holding and said carrying element holding means; means for fixing a blade to said carrying element.

24. A machine adapted to fix turbine blades to their carrying elements comprising in combination, means for holding a blade; means for holding a carrying element; means for fixing a blade to said carrying element; means for effecting a relative displacement of said blade holding and carrying element holding means for the next fixing operation.

25. A machine adapted to fix turbine blades to their carrying elements comprising in combination means for holding a blade; means for holding a carrying element; means for fixing a blade to its carrying element; means for effecting a relative displacement in a certain plane of said blade holding and carrying element holding means for the next fixing operation and other means for setting the relative angular position of said blade holding and carrying element means about an axis in said certain plane.

26. In combination in apparatus for fixing turbine blades to their carrying elements, co-acting blade clamping jaws, one of said jaws having an operative clamping protuberant area on the side thereof adjacent to said other jaw and a hollow area on the side remote and the other of said clamping jaws having an operative hollow area on the side thereof adjacent to said first mentioned jaw and a protuberant area on the side remote, together with means for operating said clamping jaws.

In witness whereof I have hereunto set my hand in presence of two witnesses.

SEBASTIAN ZIANI DE FERRANTI.

Witnesses:
BERTRAM H. MATTHEWS,
WALKER J. SKERTEN.